United States Patent Office

2,930,106
Patented Mar. 29, 1960

2,930,106

GASKETS

Arthur C. Wrotnowski, Greenwich, and Thomas J. Gillick, Jr., Norwalk, Conn., assignors to American Felt Company, Glenville, Conn., a corporation of Massachusetts No Drawing. Application March 14, 1957
Serial No. 645,903

7 Claims. (Cl. 28—80)

This invention relates to a new product suitable for use as a gasketing or packing material where a high resistance to chemicals is required and to gaskets or packings made therefrom. It relates more specifically to a method for preparing such a product by impregnating and coating a chemically resistant felt-like structure having three-dimensional stability with uncured particles of a tetrafluoroethylene resin known as "Teflon."

A simplified flow diagram of the process is as follows:

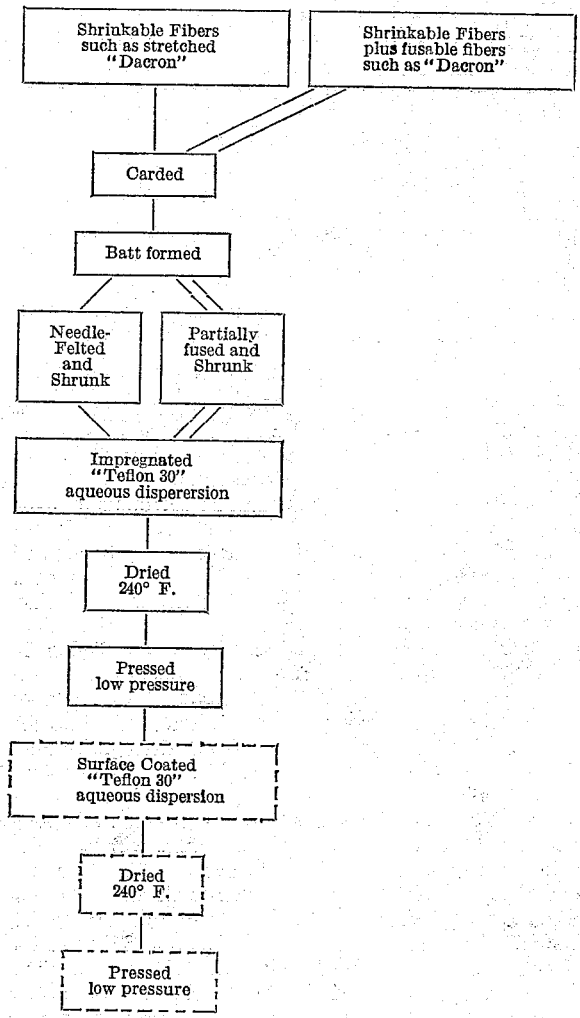

Teflon is a polytetrafluoroethylene resin material which has a crystalline structure at normal temperatures, but when heated above 620° F., changes to an amorphous transparent gel. It has been previously used as gasketing material in various forms mainly in a cured or fully polymerized form.

Teflon has certain outstanding characteristics which make it useful as gasketing material. It is inert to all chemicals except molten alkali metals and fluorine at elevated pressures and temperatures. It has high heat resistance, low coefficient of friction and is non-adhesive. It is, moreover, capable of continuous service at temperatures from −90° to 500° F. without loss of efficiency. However, when heated to around 700° F. Teflon polymerizes into a solid somewhat inflexible form which is, however, subject to cold flow under pressure and does not have the compressibility (without flow) and other properties necessary for satisfactory gasketing. For proper gasketing a gasketing material should have a combination of various properties such as compressibility, adjustment to irregular surfaces, sealing properties without flow and in the present instance chemical resistance. Teflon per se does not have all these properties.

Teflon has been used in a cured or polymerized form as solid gaskets and packings where a high resistance to chemical activity and low coefficient of friction is needed. However, the solid gaskets and packings of cured Teflon resins have had certain disadvantages. They lack "gasketing action" which is an essential to good seating and sealing, they lack resilience, and under high strain tend to crack. In addition, since solid polymerized Teflon gaskets permanently laterally deform under sustained high pressures, they cannot be re-used because of cold flow.

When solid Teflon is used as a packing around shafts in centrifugal pumps for example, the rubbing speed is very important. Frictional heat is developed at a slower rate in unlubricated Teflon packing than in other materials because of the low coefficient of friction of Teflon. However, the low thermal conductivity of Teflon retards heat dissipation and its high coefficient of thermal expansion reduces clearance as the temperature rises. Therefore, it has been necessary to use means to provide space for expansion when using Teflon packing in high speed applications.

In order to overcome some of the disadvantages of the solid or polymerized Teflon, gaskets have been produced which take advantage of the resilience of asbestos, rubber and other like materials. In such gaskets, the resilient material is usually surrounded by a thin envelope or layer of polymerized Teflon material. These composite gaskets have the chemical resistance of Teflon in addition to the resilience of the filler material. Other means used to overcome the disadvantage of solid Teflon gaskets and packings are the spring loading of stuffing boxes to accommodate the high thermal expansion of Teflon, and the spring loading of gasket joints. All these gaskets are expensive and in addition they do not provide the uniform resiliency of a true gasketing material.

Woven cloth of sintered glass fibers has also been impregnated with an aqueous dispersion of Teflon solids and used as a gasketing material. However, this material has the disadvantage that it is somewhat brittle and will not stand excessive flexing. In addition, cutting gaskets from such a material produces weaknesses and ragged edges. Such gaskets are further limited in thickness to the thickness of the glass strands unless laminates are made. They also lack the resilience necessary for good gasketing action.

Polytetrafluoroethylene fibers have been felted and impregnated with Teflon resin to produce gasketing materials essentially composed entirely of Teflon. Gaskets of this material are subject to cold flow under pressure, somewhat similar to rubber, and are therefore unsatisfactory for this reason.

As a further means to overcome the disadvantages of solid cured Teflon gaskets, Teflon has been mixed with other materials, such as carbon, graphite, asbestos, talc, powdered metals and glass fibers. These additives give certain improved properties to the Teflon gaskets molded from the mixture, depending on the filler material used. For example, thermal conductivity, and the resistance to compression may be improved. However, none of these materials improve the resilience and gasketing action of the finished cured Teflon gasket which is so essential to proper operation of gasket materials.

It is the object of this invention to produce a material suitable for gasketing purposes which has high chemical resistance, and is compressible without flow.

Another object is to produce a material suitable for packings and gaskets which is chemically resistant and non-heat expansive at high rubbing speeds.

Another object is to produce an uncured Teflon impregnated gasket material which is compressible but does not permanently laterally deform under high gasketing pressures.

Another object is to provide a method for incorporating uncured Teflon resins permanently into a gasketing material to obtain increased three-dimensional stability and still provide gasket action.

Another object is to produce a felted gasketing material impregnated with uncured Teflon resin which has three-dimensional strength, and has the required porosity to permanently retain the uncured Teflon resin particles in and on the felted base structure.

Another object is to produce a Teflon gasketing material which is relatively inexpensive as compared with prior Teflon gaskets and which may be reused.

Another object is to produce a Teflon gasket which is 100% resilient at 300° F. when, for example, torque pressure from flange bolting is applied.

Various other objects and advantages of our invention will become apparent as this description proceeds.

These and other objects may be accomplished and the disadvantages of the prior art gasketing and packing materials may be overcome by the use of gasketing material which comprises a base material of chemically resistant felt impregnated with uncured Teflon resin particles. Felt, as is well known, is a non-woven fabric composed of fibers which are mechanically interlocked and intertwined, without weaving, spinning or knitting. Such a structure has three-dimensional strength; that is, lengthwise and widthwise strength and resistance to splitting through its thickness. It is pulled apart with difficulty and has a high degree of compressibility with complete freedom from lateral flow. Felt is well known as a gasketing material and has wide application as such, due to its resilience and strength. By impregnating felt with uncured tetrafluoroethylene resin particles as contained in a Teflon dispersion in such a manner that Teflon solids remain in the voids of the felt and on the exposed surfaces thereof, all the advantages of the properties of Teflon, such as high chemical resistance, low coefficient of friction, and non-adhesiveness, are obtained without the disadvantages, such as lack of compressibility, lateral flow and high thermal expansion. The Teflon particles are negatively charged and have an average particle size of about 0.3 micron and due to their negative charge and extremely fine particle size adhere well and completely cover the felt body without depriving the felt body of its inherent compressibility and three-dimensional stability. Thus, the gasket material of our invention possesses both the advantages of the chemical resistance of Teflon and the gasketing and other properties of felt.

Any felt material which is chemically resistant may be used as the base for our new gasket material, such as a felt produced from synthetic polyester fibers known as Dacron, Terylene, Mylar, etc., or felts produced from other synthetic fibers, such as polyamide fibers, or Acrylic fibers sold as Orlon, nylon, Acrilan, etc., and even metallic fibers. The synthetic fibers should be heat resistant up to 300° F. These felt materials are impregnated with Teflon by means of an aqueous dispersion since Teflon is relatively insoluble in most common solvents. A suitable dispersion of Teflon is that which is commercially available as Teflon-30. This dispersion (as supplied by E. I. du Pont de Nemours and Company, Wilmington, Delaware) contains 60% Teflon as solids by weight and about 6% of a wetting and dispersing agent. Additional wetting agents can be added to improve the wetting characteristics if desired. Non-ionic wetting agents, such as Triton X–100, (Rohm and Haas Company, Philadelphia, Pennsylvania) are most satisfactory for use with the Teflon. A gasketing material prepared from these synthetic fiber felts and an aqueous dispersion of tetrafluoroethylene solids has substantially the same chemical resistance as Teflon in many cases (hydrogen peroxide resistance for example), plus a superior gasketing action.

The gasket material of our invention may be produced in the following manner. A batt of synthetic fibers is first carded and shrunk in known manner to form a felt fabric of any desired weight. This felt fabric may then be subjected to a conventional needle loom process, if desired, in which a certain amount of fibers are upended and interlocked so as to form a felt fabric having tensile strength in all directions and/or a felt base may be provided by felting and then fusing synthetic fibers into a felted structure capable of subsequent impregnations. The felted structure is then run through an impregnating bath of Teflon 30 aqueous dispersion. Subsequent to this impregnation, the felted structure is run between squeeze rolls adjusted to retain up to 200% of liquid, based on the dry starting weight of the fabric, in the impregnated felt. The impregnated material is then dried to remove the moisture after which about 120% of Teflon solids by weight are contained within the fiber structure. If desired the impregnation and drying may be carried out in more than one step in order to obtain the high percentage of Teflon adsorption desired. This multiple treatment may be carried out in a continuous manner well known in the art by passing the fabric over rollers into a dip tank of the aqueous Teflon dispersion and thence through squeeze rolls and upwardly through a vertical baking tower, over rollers in the top of the tower, then downwardly through the tower and through a second dip tank. From this point the procedure may be repeated by passing the fabric to subsequent dip tanks and drying, any number of times required.

In order to assume an ample further surrounding layer of Teflon on the surface of the dry impregnated felt, additional coatings of Teflon 30 dispersions may be applied on the surfaces of the impregnated felt by means of a roller coating, doctor blade coatings, spraying or the like. In applying the Teflon by any of these methods it may be desirable to increase the viscosity of the Teflon 30 dispersion by stirring in a thickener such as, for example, a sodium polyacrylate solution. About 3 to 5 oz. of Teflon solids per square yard of fabric are added to the surfaces of the fabric by coating. After drying, the coating operation may be repeated if desired. The flexible, compressible gasket material so produced is now compressed in a press, for example, a platen press, at a temperature of about 250° F. for a short time with pressures sufficient to produce the desired thickness. The pressure and time will vary according to the thickness of the finished gasket desired and the weight of the starting felt fabric. The pressing develops a smooth finish and a gasket material of uniform thickness. Gaskets or packing materials of any desired shape or size may be formed from our new packing material by cutting or shaping the material in any manner well known in the art. The gaskets are finished products and require no further processing or treatment before use in most cases. However, for some applications where even more chemical resistance and improved physical properties are desired, the gasket material is boiled in water for one half hour, the water poured off, the part reboiled in new water for another half hour. In place of boiling, continuous flushing with boiling water for one hour or more is also satisfactory. This boiling water treatment leaches out residual Triton X-100 dispersing agent and allows the Teflon particles to cohere into a homogeneous film material of good strength and surface properties. This improved impermeable surface also provides an excellent lubricating bearing surface with a very low coefficient of friction.

The following examples are illustrative of our invention and are not intended to be limitative as to materials used and conditions set forth therein.

*Example I*

Shrinkable polyester fibers commercially available, as stretched Dacron fibers, are those which have been stretched during manufacture approximately two to three times normal length and which when subjected to temperatures in excess of 180° F. will return to normal length. Other synthetic fibers which are capable of being stretched and having their tensions released to cause shrinkage with heat may likewise be used.

For the purpose of this example stretched polyester or Dacron cut staple fibers were used. The fibers were carded on conventional wool felt carding equipment and individual webs from the cards fed onto an endless apron both lengthwise and crosswise until a batt was formed having a weight of approximately 14 oz. per square yard. This carded batt was then subjected to multiple needlings by the needle loom process until the fibers had become sufficiently interlocked to yield a fabric having proper tensile and splitting strengths to withstand further processing. This mechanically interlocked felt fabric was then subjected to heat to shrink the same. For ease of operations, the felt fabric was submersed in hot water of 180°–200° F. The heat released the stretched fiber tensions and created an approximate area shrinkage of 35% in the felt fabric. After drying the material weighed from 20–22 oz. per square yard. This dry fiber interlocked and shrunk felt was then impregnated with a polytetrafluoroethylene aqueous dispersion commonly available as Teflon 30 and having a normal dry solids content of about 60% polytetrafluoroethylene. After impregnation, the felt was run through squeeze rollers so adjusted as to permit a wet pickup of about 200% by weight of the liquid Teflon dispersion on the dry weight of the felt. After drying to remove the water, there was deposited throughout the entire interstices, approximately 120% of Teflon solids by weight on the dry weight of the felt. To incorporate additional amounts of Teflon solids, especially on the outer surfaces of the felt, the dried impregnated fabric was coated by doctor blade or other conventional method, whereby one or more coatings of the Teflon 30 were applied to each surface with intermediate drying. In order to facilitate spreading, the Teflon dispersion may be thickened by stirring in approximately 4% of poly-acrylate solution, commonly available as Acrysol (Rohm and Haas Company, Philadelphia, Pennsylvania). The coating is controlled to deposit about 4 oz. of Teflon dry solids per square yard of fabric on each side of the fabric. The impregnated and coated felt now contains 160% of dry Teflon solids over the starting weight of 20 oz. per square yard for the interlocked and shrunk felt. The finished gasket fabric weighs about 52 oz. per square yard. The flexible, unsintered gasket material so produced is subjected to pressing at a pressure of the order of 400,000 p.s.i.g. in a platen press maintained at a temperature of 240° F. to produce a smooth finish and a uniform 1/16 inch gasket material. The actual pressure on the material being pressed will depend upon the size of the sheet subjected to the pressing and may vary from 25 p.s.i.g. to 1000 p.s.i.g. Different thickness and weights may, of course, be produced by suitably varying the manufacturing process. Stop bars may be used in the press to control the thickness of the gasket material if desired and thicknesses of from 0.008 inch to 2 inches may be produced by making multiple ply laminates.

*Example II*

Undrawn, commercially available, Dacron polyester fibers possess cohesive bonding properties with other Dacron fibers when subjected to heat of about 300° F. and pressure as obtained in a platen press or calendar is used in this example. For the purpose of this example, cut staple undrawn Dacron fibers and conventional drawn Dacron cut stable fibers having approximately 11 to 12% shrinkage at 212° F. were blended in the proportion of 40% undrawn Dacron fibers and 60% conventional Dacron fibers. The blend of fibers was carded on conventional wool felt carding equipment and individual webs from the card fed onto an endless apron both lengthwise and crosswise until a batt was found having an approximate weight of 14 oz. per square yard. This carded batt was then subjected to heat and pressure in a platen press. Under the conditions of heat of about 300° F. and pressure, the undrawn Dacron fibers partially melt and fuse with the drawn fibers. This melting and fusing of undrawn Dacron polyester fiber and the drawn Dacron fibers produces a fiber bonded non-woven fabric felt. For the purpose of this example fibers of Vinyon, a copolymer of polyvinyl chloride and polyvinyl acetate, plasticized acetate rayon fibers commercially known as Plasteca; or other thermoplastic or thermosetting fibers possessing cohesive and/or adhesive properties may be used in place of the undrawn Dacron fiber. However, the resultant non-woven felt fabric felt will not possess the chemical and thermal stability properties of the Dacron felt described and will not be as satisfactory for gasketing for purposes where chemical resistance is important.

The non-woven felt fabric consisting of 40% undrawn Dacron fiber and 60% conventional Dacron fiber so produced possesses the three-dimensional strength requirements necessary to withstand further processing. The non-woven fabric produced as described above was impregnated and coated with Teflon 30 dispersion as described in Example I. The flexible unsintered Teflon impregnated gasketing material so produced was subjected to final pressing cycle in a platen press to produce a smooth surface and a gasketing material of the desired uniform thickness. If desired, the gasket material of Examples I and II may be subjected to treatment with boiling water to leach out residual Triton X-100 before being put into use.

*Example III*

Metal felt as produced by carding, cross layering, felting and needling metal fibers, as described, for example, in U.S. Patent 2,593,373 is pressed at a pressure of about 500 pounds per square inch to densify the metal felt and then impregnated with uncured tetrafluoroethylene aqueous emulsion known as Teflon 30 substantially as described in Example I. After impregnation the Teflon impregnated metal fibers may be pressed to the desired thickness and cut to form gaskets and bearing materials of the desired shape and size.

In each of the above examples the Teflon particles in the emulsion, having an average particle size of about 0.3 micron, penetrate into the interstices of the felted structure and completely cover the felt base with a chemically resistant Teflon coating which still possesses the gasketing properties of felt. The negative charge on the Teflon particles and the more positive charge on the Dacron fibers tends further to promote adhesion beyond the mere impregnation adhesion.

While we have recited the use of our material as a gasketing or packing material, it need not necessarily be limited to such use. The product may be used in any application where the combined advantages of Teflon and felt will be useful, for example, a Teflon impregnated felt of the type disclosed can be used in a variety of operations in which sticky materials are handled by covering the critical surfaces of the processing equipment with a layer of our material and thereby obtaining the advantages of the non-adhesiveness and chemical resistance of Teflon and the strength, reliability and resilience of felt as, for example, in conveyor belts. This Teflon impregnated felt when slit into lengths and spirally wrapped, or Teflon impregnated felt when the felt is made as tubing in lengths can serve alone or as the lining or core for tubes and hoses conveying corrosive chemicals such as, but not necessarily, restricted to 90% hydrogen peroxide. When spiral wrap lengths or felt formed tube impregnated material of this type is made as a hose or tube and the inside diameter is flushed with boiling water, a leaching of the dispersing agent occurs and the Teflon particles form into a continuous film Teflon tube or hose lining.

Various changes may be made in the embodiments and examples and preferred methods for carrying out our invention described above and it will be understood that various changes and modifications may also be made in the materials and procedures within the spirit of our invention and the scope of the appended claims.

We claim:

1. A fabric having improved cold-flow stable gasketing action comprising a felt-like fabric, having three-dimensional stability and formed of chemically resistant fibers selected from the group consisting of polyester fibers, polyamide fibers, polyacrylonitrile fibers, polyacrylate fibers, metal fibers and mixtures thereof, impregnated with solid uncured polytetrafluoroethylene particles in non-fibrous form.

2. A fabric having improved cold-flow stable gasketing action comprising a shrunk, needle-felted fabric, having three-dimensional stability and formed of chemically-resistant shrinkable fibers selected from the group consisting of polyester fibers, polyamide fibers, polyacrylonitrile fibers, polyacrylate fibers, metal fibers and mixtures thereof, impregnated with solid, uncured polytetrafluoroethylene particles in non-fibrous form.

3. A fabric having improved cold-flow stable gasketing action comprising a fused fiber-bonded felted fabric having three-dimensional stability and formed of chemically-resistant fibers selected from the group consisting of polyester fibers, polyamide fibers, polyacrylonitrile fibers, polyacrylate fibers, metal fibers and mixtures thereof, impregnated with solid, uncured polytetrafluoroethylene particles in non-fibrous form.

4. As a product of manufacture, a cold-flow stable fabric having gasketing properties comprising a felt-like structure having three-dimensional stability formed from polyester fibers, impregnated with solid, uncured polytetrafluoroethylene particles in non-fibrous form.

5. As a product of manufacture, a cold-flow stable fabric having gasketing properties comprising a fused fiber-bonded felted fabric having three-dimensional stability formed from polyester fibers impregnated with solid, uncured polytetrafluoroethylene particles in non-fibrous form.

6. As a product of manufacture, a cold-flow stable fabric having gasketing properties comprising a needle-felted fabric having three dimensional stability formed from metal fibers, impregnated with solid, uncured polytetrafluoroethylene particles in non-fibrous form.

7. As a product of manufacture, a cold-flow stable fabric having gasketing properties comprising a shrunk, needle-felted fabric having three-dimensional stability formed from polyester fibers, impregnated with solid, uncured polytetrafluoroethylene particles in non-fibrous form.

References Cited in the file of this patent

UNITED STATES PATENTS

| | | |
|---|---|---|
| 2,539,329 | Sanders | Jan. 23, 1951 |
| 2,631,355 | Craig | Mar. 17, 1953 |
| 2,677,872 | Teague | May 11, 1954 |
| 2,686,738 | Teeters | Aug. 17, 1954 |
| 2,764,506 | Piccard | Sept. 25, 1956 |
| 2,773,781 | Rodman | Dec. 11, 1956 |
| 2,813,041 | Mitchell et al. | Nov. 12, 1957 |
| 2,840,881 | Bateman | July 1, 1958 |
| 2,843,502 | Fay | July 15, 1958 |

UNITED STATES PATENT OFFICE
CERTIFICATE OF CORRECTION

Patent No. 2,930,106                  March 29, 1960

Arthur C. Wrotnowski et al.

It is hereby certified that error appears in the printed specification of the above numbered patent requiring correction and that the said Letters Patent should read as corrected below.

Column 1, line 44, in the box, for "disperersion" read -- dispersion --; line 56, to the right of the box insert -- Optional --; column 4, line 48, for "assume" read -- assure --; lines 49 and 50, for "Teffon", each occurrence, read -- Teflon --; column 5, line 3, for "more in" read -- more is --; line 18, for "doring" read -- during --; column 6, line 36, strike out "for"; line 46, for "to final" read -- to a final --.

Signed and sealed this 25th day of October 1960.

(SEAL)
Attest:

KARL H. AXLINE                                        ROBERT C. WATSON
Attesting Officer                                    Commissioner of Patents